No. 657,820.  
R. D. GRAY.  
LENS.  
(Application filed July 18, 1900.)  
(No Model.)

Patented Sept. 11, 1900.

WITNESSES:  
Edward Thorpe

INVENTOR  
Robert D. Gray  
BY  
ATTORNEYS

UNITED STATES PATENT OFFICE.

ROBERT D. GRAY, OF NEW YORK, N. Y.

LENS.

SPECIFICATION forming part of Letters Patent No. 657,820, dated September 11, 1900.

Application filed July 15, 1899. Serial No. 723,880. (No model.)

*To all whom it may concern:*

Be it known that I, ROBERT D. GRAY, of the city of New York, borough of Manhattan, in the county and State of New York, have invented a new and useful Improvement in Lenses, of which the following is a full, clear, and exact description.

The invention relates to optical objectives for use in photographic apparatus, telescopes, and other optical instruments; and the object of the invention is to provide certain new and useful improvements in lenses, whereby the effective aperture of the objective is greatly increased and spherical and oblique aberration and astigmatism are reduced to a minimum.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in both views.

Figure 1:
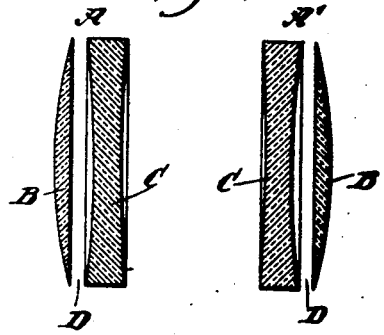
Figure 2:
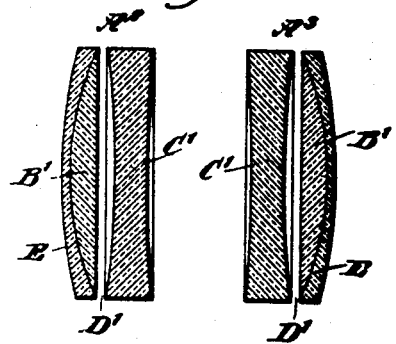

Figure 1 is a sectional side elevation of an objective for a photographic camera, showing my improvement. Fig. 2 is a like view of a modified form of the same.

Each element of an optical objective for photographic or other apparatus as heretofore constructed consisted, essentially, of a collecting, condensing, or positive lens of crown glass and a dispersing or negative lens of flint glass, the negative lens being of a higher refractive index than the positive lens. Objectives constructed in this manner are seriously defective, and the spherical and oblique aberration increases with an attempted increase of effective aperture, and in order to overcome this defect I construct each element with a positive lens having a higher refractive index than that of the negative lens. Glasses of high refractive index require longer radii of curvature for a given focal length than those of less refractive index. Consequently there is less spherical aberration in such a lens, and glasses of low refractive index require shorter radii of curvature for a given focal length with an increase of spherical aberration. It is now evident that if a glass of the lowest refractive index be used for the negative lens and a glass of higher index be used for the positive lens then the positive spherical aberration of the positive lens can be corrected for a relatively greater diameter without destroying the positive nature of the combination than can be done by the reverse proceeding as heretofore practiced. Another advantage gained by constructing the objective as described is a like reduction of oblique spherical aberration and a relative lengthening of the focus of those rays which pass through the latitudinal section of the lenses, thereby reducing astigmatism to a minimum.

As shown in Fig. 1, the two elements A A' are each provided with a positive lens B, of crown glass, and a negative lens C, of flint glass, the lenses being spaced apart to form an air-space D between the same, as is plainly indicated in said Fig. 1. The positive lens B has a higher refractive index than the negative lens C, for the purpose previously mentioned.

The objective shown in Fig. 2 is provided with two elements $A^2 A^3$, each having a positive lens B', a negative lens C', and a third lens E, preferably in the form of a meniscus lens and of a low refractive index similar to that of the lens C', but with a dispersion to allow of making secondary corrections, and consequently rendering the element more achromatic. An air-space D' is left between the lenses B' and C' in each element $A^2 A^3$.

It is understood that if the lenses B and C were placed in contact with each other without an intervening air-space then pronounced astigmatism would be the consequence, and hence separating the lenses is a very important feature of my invention. The amount of this separation of the lenses varies with the thickness of either of the lenses or all of the lenses in the combination and with the amount of separation between the elements. Now by having the lenses in each element separated allows more freedom in the selection of the inner curves, as it is evident that if there is no space the adjacent or contacting faces of the lenses must be alike in curvature. Now by the space between the lenses the curvature of the adjacent faces can be varied to lengthen the focus of the oblique rays of light independently of the axial focus to minimize or cure astigmatism.

In order to produce an achromatic objective with the glasses most suitable for eliminating the aberrations referred to, it is necessary to construct the lenses with relatively-deeper curves than is usually made, or the third lens may be added to the element, as above shown and described in Fig. 2. By having the third lens of a negative character and of lower refractive index than the positive lens B the radius of the convex surface of E must be longer for a given focus in the compound lens than would be required in a simple positive lens. The object of lengthening the radius of this surface is the further correction of astigmatism. I prefer that the lens E shall have a greater power of dispersion than the lens B, which permits the lens C to be of lower refraction index than the lens B, but of slightly higher dispersion, so that each element may be achromatic whether used singly or in combination. When using the third lens E, then the convex surface of the positive lens B' is of a shorter radius than when using only the two lenses B and C, as shown in Fig. 1, so that the focal length is preserved, the two lenses B' and E being preferably cemented together without an intervening air-space.

As shown in Fig. 1, the negative lens C is of double-convex form, while the positive lens B is plano-convex.

As shown in Fig. 2, the lenses C' and B' are of similar form to the lenses B and C, the lens E being of meniscus form, as previously mentioned.

It is understood that for photographic objectives two elements are usually employed, but for telescope and other objectives only one is necessary.

Having thus fully described my invention, I claim as new and desire to secure by Letters Patent—

1. In an element for an optical objective, the combination of a plano-convex positive lens with a double-concave negative lens, said positive lens having a higher refractive index than the said negative lens.

2. In an element for an optical objective, the combination of a plano-convex positive lens with a double-concave negative lens, the positive lens consisting of two sections, one of the sections of said positive lens being of higher refractive index than its other section and than the negative lens.

3. An element for an optical objective, comprising a plano-convex positive lens and a double-concave negative lens, the lenses being spaced apart to leave a plano-convex air-space between the lenses, the positive lens having a higher refractive index than the negative lens.

ROBERT D. GRAY.

Witnesses:
THEO. G. HOSTER,
EVERARD BOLTON MARSHALL.